US008793152B2

(12) United States Patent
Bishop et al.

(10) Patent No.: US 8,793,152 B2
(45) Date of Patent: Jul. 29, 2014

(54) MINING OF DISTRIBUTED SCIENTIFIC DATA FOR ENRICHED PRODUCT/CONTACT VALUATION

(76) Inventors: Joseph Ruston Bishop, San Diego, CA (US); Marcia Beth Allen, San Diego, CA (US)

( * ) Notice: Subject to any disclaimer, the term of this patent is extended or adjusted under 35 U.S.C. 154(b) by 559 days.

(21) Appl. No.: 12/784,258

(22) Filed: May 20, 2010

(65) Prior Publication Data

US 2010/0299184 A1 Nov. 25, 2010

Related U.S. Application Data

(60) Provisional application No. 61/179,952, filed on May 20, 2009.

(51) Int. Cl.
*G06Q 10/00* (2012.01)

(52) U.S. Cl.
USPC ........................................................ 705/7.29

(58) Field of Classification Search
USPC ........................................................ 705/7.29
See application file for complete search history.

(56) References Cited

U.S. PATENT DOCUMENTS

| | | | | |
|---|---|---|---|---|
| 6,154,738 | A * | 11/2000 | Call | 705/20 |
| 2002/0091688 | A1 * | 7/2002 | Decary et al. | 707/6 |
| 2003/0069659 | A1 * | 4/2003 | Wada et al. | 700/108 |
| 2008/0270363 | A1 * | 10/2008 | Hunt et al. | 707/3 |
| 2009/0192808 | A1 * | 7/2009 | Sela | 705/1 |
| 2009/0216625 | A1 * | 8/2009 | Erlebacher et al. | 705/10 |

* cited by examiner

*Primary Examiner* — Johnna Loftis

(74) *Attorney, Agent, or Firm* — Nath, Goldberg & Meyer; Jerald L. Meyer; Stanley N. Protigal

(57) ABSTRACT

Methods and systems are described that detail the rapid validation of scientific products and scientist consumer information derived from multiple science/research based sources, such as peer-reviewed scientific publications and online resources, for example, as well as any other available tasked forum or venue. The refined information will facilitate unique product evaluation opportunities via an accessible website/forum, trade shows, etc., and provide previously unknowable sales leads, market intelligence, and targeted advertising opportunities for life science product manufacturers.

20 Claims, 11 Drawing Sheets

30
Public information/ Websites
33
34
Blogs
Subscription-based Sources
35
37
Private Organizations
32
Scientist
38
Vendors
36
Mine for data on products, central conduit, etc.
Researcher
31
Misc
39a
Web Sites
Vendors
39

Product Name: Product XYZ

Product Manufacturer: ABC Inc.,

Product Wholesellers - PP Lifescience

Product Category: Transfection, Cell Culture, siRNA

Keywords: optimize, reagent, mammalian, primary, endothelia, transformed, gene silencing, expression, RNAi

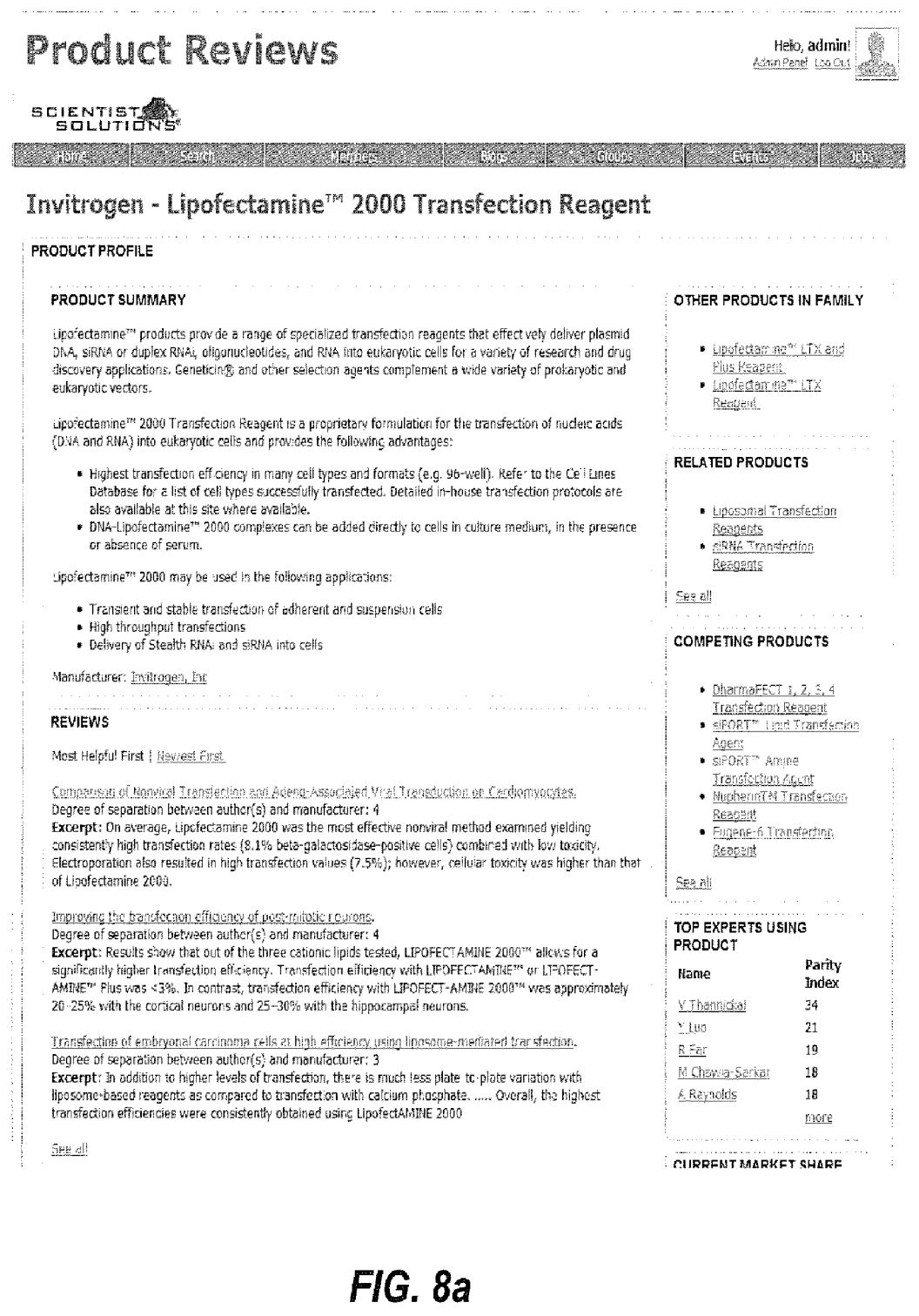

Product Reviews

Hello, admin! Admin Panel Log Out

SCIENTIST SOLUTIONS

Home | Search | Members | Blogs | Groups | Events | Jobs

Invitrogen - Lipofectamine™ 2000 Transfection Reagent

PRODUCT PROFILE

PRODUCT SUMMARY

Lipofectamine™ products provide a range of specialized transfection reagents that effectively deliver plasmid DNA, siRNA or duplex RNAi, oligonucleotides, and RNA into eukaryotic cells for a variety of research and drug discovery applications. Geneticin® and other selection agents complement a wide variety of prokaryotic and eukaryotic vectors.

Lipofectamine™ 2000 Transfection Reagent is a proprietary formulation for the transfection of nucleic acids (DNA and RNA) into eukaryotic cells and provides the following advantages:

- Highest transfection efficiency in many cell types and formats (e.g. 96-well). Refer to the Cell Lines Database for a list of cell types successfully transfected. Detailed in-house transfection protocols are also available at this site where available.
- DNA-Lipofectamine™ 2000 complexes can be added directly to cells in culture medium, in the presence or absence of serum.

Lipofectamine™ 2000 may be used in the following applications:

- Transient and stable transfection of adherent and suspension cells
- High throughput transfections
- Delivery of Stealth RNAi and siRNA into cells Manufacturer: Invitrogen, Inc

REVIEWS

Most Helpful First | Newest First

Comparison of Nonviral Transfection and Adeno-Associated Viral Transduction on Cardiomyocytes.
Degree of separation between author(s) and manufacturer: 4
Excerpt: On average, Lipofectamine 2000 was the most effective nonviral method examined yielding consistently high transfection rates (8.1% beta-galactosidase-positive cells) combined with low toxicity. Electroporation also resulted in high transfection values (7.5%); however, cellular toxicity was higher than that of Lipofectamine 2000.

Improving the transfection efficiency of post-mitotic neurons.
Degree of separation between author(s) and manufacturer: 4
Excerpt: Results show that out of the three cationic lipids tested, LIPOFECTAMINE 2000™ allows for a significantly higher transfection efficiency. Transfection efficiency with LIPOFECTAMINE™ or LIPOFECT-AMINE™ Plus was <3%. In contrast, transfection efficiency with LIPOFECT-AMINE 2000™ was approximately 20-25% with the cortical neurons and 25-30% with the hippocampal neurons.

Transfection of embryonal carcinoma cells at high efficiency using liposome-mediated transfection.
Degree of separation between author(s) and manufacturer: 3
Excerpt: In addition to higher levels of transfection, there is much less plate-to-plate variation with liposome-based reagents as compared to transfection with calcium phosphate. ..... Overall, the highest transfection efficiencies were consistently obtained using LipofectAMINE 2000

See all

OTHER PRODUCTS IN FAMILY

- Lipofectamine™ LTX and Plus Reagent
- Lipofectamine™ LTX Reagent

RELATED PRODUCTS

- Liposomal Transfection Reagents
- siRNA Transfection Reagents

See all

COMPETING PRODUCTS

- DharmaFECT 1, 2, 3, 4 Transfection Reagent
- siPORT™ Lipid Transfection Agent
- siPORT™ Amine Transfection Agent
- NupherinTM Transfection Reagent
- Fugene-6 Transfection Reagent See all

TOP EXPERTS USING PRODUCT

| Name | Parity Index |
| --- | --- |
| V Thannickal | 34 |
| Y Luo | 21 |
| R Far | 19 |
| M Chawla-Sarkar | 18 |
| A Reynolds | 18 |
| | more |

CURRENT MARKET SHARE

FIG. 8a

See all

CURRENT MARKET SHARE

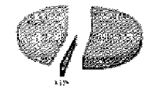

TOP CITING PUBLICATIONS

| Title | Citations |
|---|---|
| Analysis of gene function in somatic mammalian cells using small interfering RNAs<br>SM Elbashir, J Harborth, K Weber, T Tuschl - Methods, 2002 - Elsevier | 924 |
| Rational siRNA design for RNA interference<br>A Reynolds, D Leake, Q Boese, S Scaringe, WS ... - Nature Biotechnology, 2004 | 800 |
| Downregulation of Bcl-2, FLIP or IAPs (XIAP and survivin) by siRNAs sensitizes resistant melanoma ...<br>M Chawla-Sarkar, SI Bae, FJ Reu, BS Jacobs, DJ ... - Cell Death and Differentiation, 2004 | 130 |
| The activity of siRNA in mammalian cells is related to structural target accessibility: a comparison ...<br>RKK Far, G Sczakiel - Nucleic Acids Research, 2003 | 128 |
| Myofibroblast Differentiation by Transforming Growth Factor-β1 Is Dependent on Cell Adhesion and ...<br>VJ Thannickal, DY Lee, ES White, Z Cui, JM Larios, ... - Journal of Biological Chemistry, 2003 - ASBMB | 117 |

See all

MARKET SHARE TRENDS

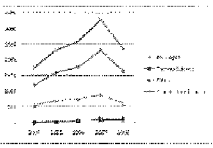

SCIENCE 2.0 CITATIONS

ScientistSolutions - Lipofectamine 2000

WEB MENTIONS

Scientist Solutions - RNAi transfection
10 Jan 2009
Cells were plated to a density of 105 cells/well in 24-well dishes on day 1, and then transfected with oligonucleotides (20 nM) using Lipofectamine 2000 (day 2). Two days later (day 4), the cells were harvested and ...

Generation of High-Titer Lentivirus for the Production of ...
5 Jan 2009 by Poynter, G., Huss, D., Lansford, R.
Use a pLenti backbone (Invitrogen). The pLenti plasmid DNA must be of very high quality (i.e., prepared using QIAGEN Maxi Prep or similar) to ensure high transfection efficiency. Lipofectamine 2000 Transfection Reagent (Invitrogen) ...

The discovery of more knowledge (in repositories, research web ...
23 Dec 2008 by V Iavelius
In vivo delivery of siRNAs was performed by using a transfection reagent (Lipofectamine 2000) at 10 h after CLP. As a negative control, animals received non-sense (scrambled) siRNA. RESULTS: Marked increases in caspase-8 and caspase-3 ...

See all

TOPIC SUMMARY

Transfection is the process of introducing nucleic acids into cells by non-viral methods [1]. The term transformation is preferred to describe non-viral DNA transfer in bacteria and non-animal eukaryotic cells such as fungi, algae and plants.

Transfection of animal cells typically involves opening transient pores or 'holes' in the cell plasma membrane, to allow the uptake of material. Genetic material (such as supercoiled plasmid DNA or siRNA constructs), or even proteins such as antibodies, may be transfected. In addition to electroporation, transfection can be carried out by mixing a cationic lipid with the material to produce liposomes, which fuse with the cell plasma membrane and deposit their cargo inside.

Source Wikipedia

RELATED TOPICS amino acids AEEX1 Apoptosis BCL2 beta-galactosidase calcium phosphate Cardiomyocytes CASP8 cornea DNA drug resistance E2F1 embryonic stem cells embryos endothelial cel GDF5 gene silencing HeLa HIV-1 INSR interferon intracellular isoforms Lipofectamine liver luciferase MIRN410 MYCN oligonucleotides phosphorothioate polymer prostate cancer RNA RNA interference RNA-induced silencing complex serum Sp1 SPATA17 TP53 Vascular endothelial growth factor

*FIG. 8b*

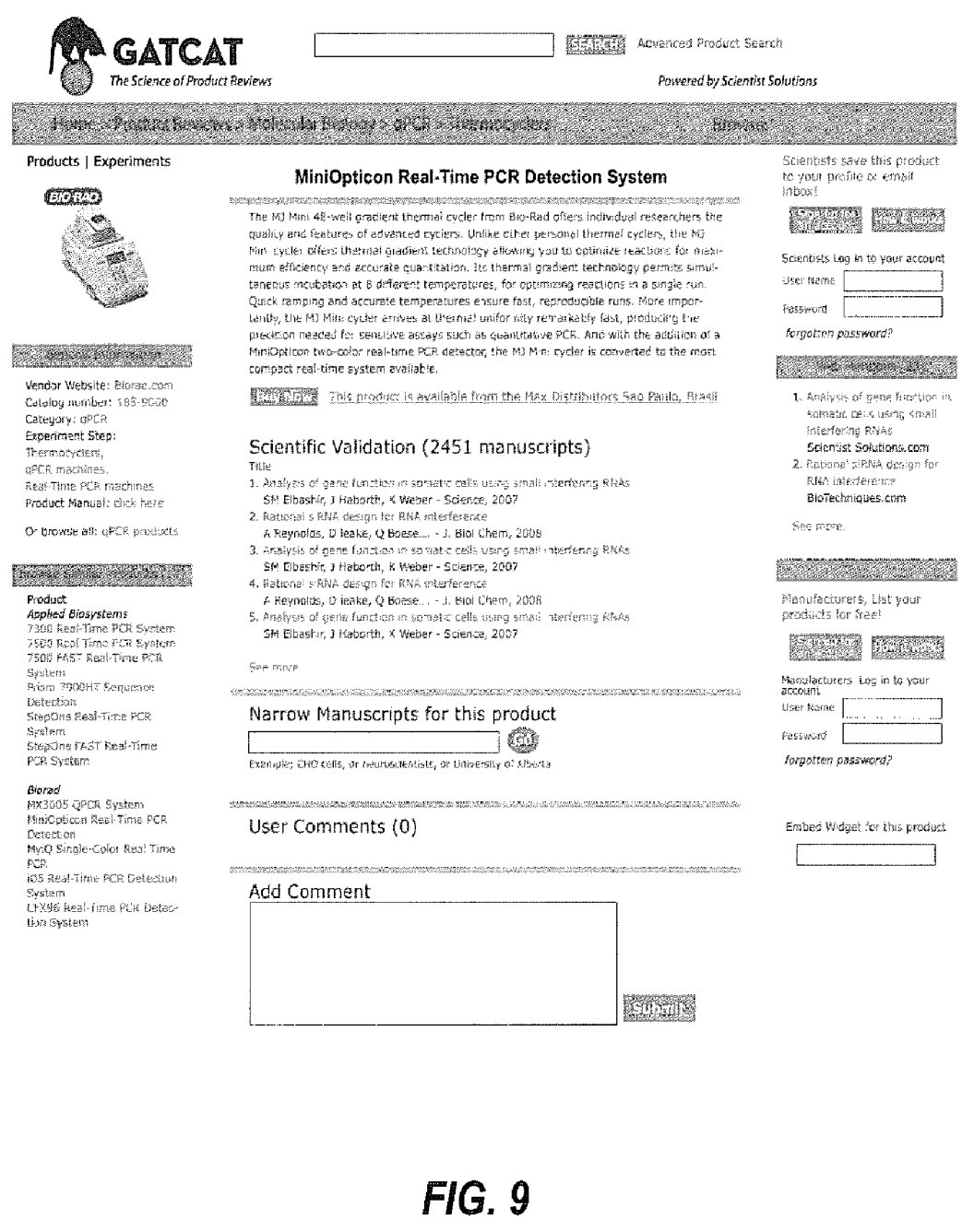

GATCAT
The Science of Product Reviews

SEARCH Advanced Product Search

Powered by Scientist Solutions

Home > Product Reviews > Molecular Biology > qPCR > Thermocyclers

Products | Experiments

MiniOpticon Real-Time PCR Detection System

The MJ Mini 48-well gradient thermal cycler from Bio-Rad offers individual researchers the quality and features of advanced cyclers. Unlike other personal thermal cyclers, the MJ Mini cycler offers thermal gradient technology allowing you to optimize reactions for maximum efficiency and accurate quantitation. Its thermal gradient technology permits simultaneous incubation at 8 different temperatures, for optimizing reactions in a single run. Quick ramping and accurate temperatures ensure fast, reproducible runs. More importantly, the MJ Mini cycler arrives at thermal uniformity remarkably fast, producing the precision needed for sensitive assays such as quantitative PCR. And with the addition of a MiniOpticon two-color real-time PCR detector, the MJ Mini cycler is converted to the most compact real-time system available.

Buy Now This product is available from the Max Distributors Sao Paulo, Brasil

Vendor Website: Biorad.com
Catalog number: 185-9000
Category: qPCR
Experiment Step: Thermocyclers, qPCR machines, Real-Time PCR machines
Product Manual: click here Or browse all: qPCR products

Scientific Validation (2451 manuscripts)

Title

1. Analysis of gene function in somatic cells using small interfering RNAs
   SM Elbashir, J Haborth, K Weber - Science, 2007
2. Rational siRNA design for RNA interference
   A Reynolds, D leake, Q Boese.... - J. Biol Chem, 2008
3. Analysis of gene function in somatic cells using small interfering RNAs
   SM Elbashir, J Haborth, K Weber - Science, 2007
4. Rational siRNA design for RNA interference
   A Reynolds, D leake, Q Boese... - J. Biol Chem, 2008
5. Analysis of gene function in somatic cells using small interfering RNAs
   SM Elbashir, J Haborth, K Weber - Science, 2007

See more

Narrow Manuscripts for this product

GO

Example: CHO cells, or neuroscientists, or University of Alberta

User Comments (0)

Add Comment

Submit

Product
*Applied Biosystems*
7300 Real-Time PCR System
7500 Real Time PCR System
7500 FAST Real-Time PCR System
Prism 7900HT Sequence Detection
StepOne Real-Time PCR System
StepOne FAST Real-Time PCR System

*Biorad*
MX3005 QPCR System
MiniOpticon Real-Time PCR Detection
MyiQ Single-Color Real Time PCR
iQ5 Real-Time PCR Detection System
CFX96 Real-Time PCR Detection System Scientists save this product to your profile or email inbox!

Scientists Log in to your account
User Name
Password
*forgotten password?*

1. Analysis of gene function in somatic cells using small interfering RNAs
   Scientist Solutions.com
2. Rational siRNA design for RNA interference
   BioTechniques.com See more.

Manufacturers, List your products for free!

Manufacturers Log in to your account
User Name
Password
*forgotten password?*

Embed Widget for this product

FIG. 9

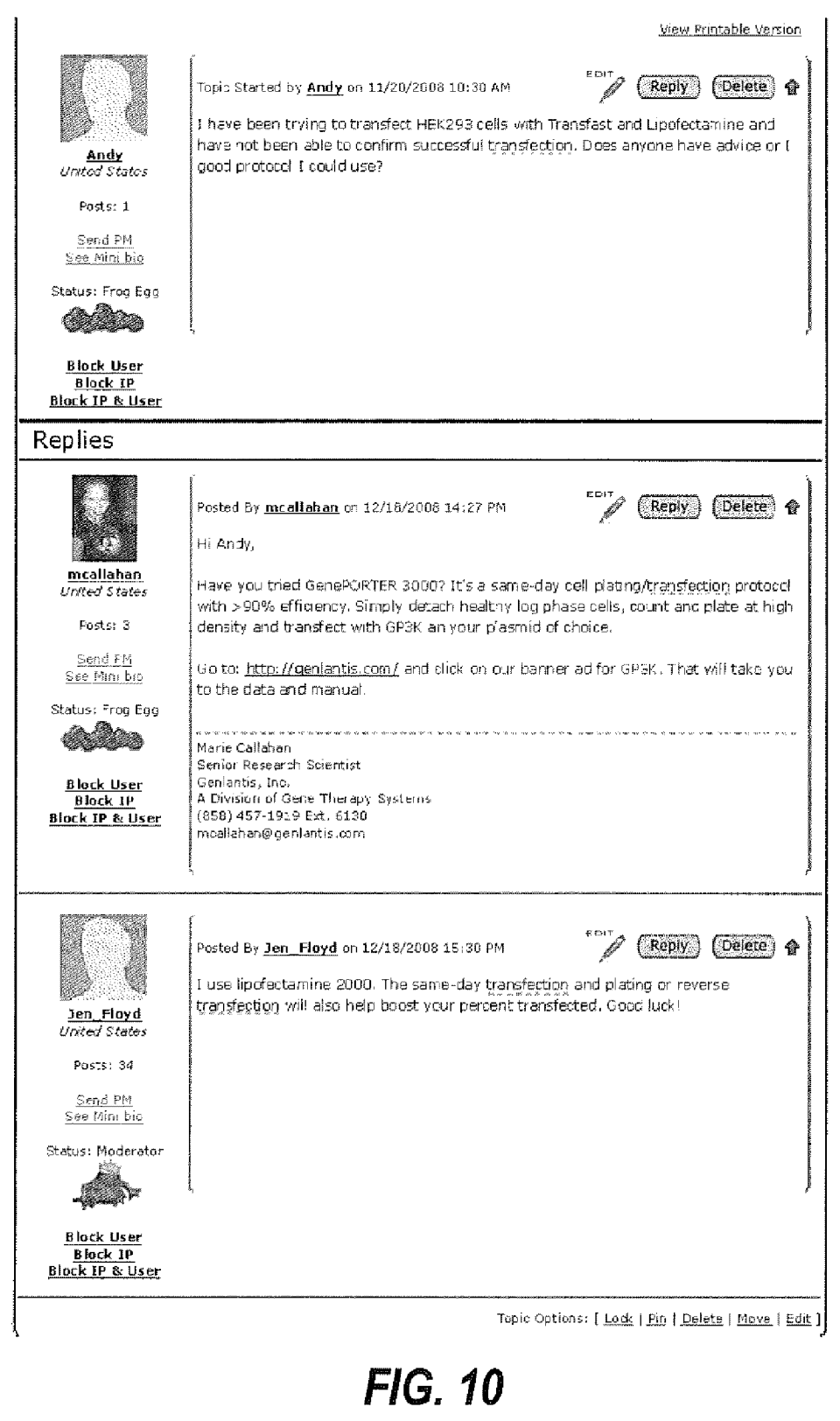

View Printable Version

Andy
United States

Posts: 1

Send PM
See Mini bio

Status: Frog Egg

Block User
Block IP
Block IP & User

Topic Started by Andy on 11/20/2008 10:30 AM EDIT Reply Delete

I have been trying to transfect HEK293 cells with Transfast and Lipofectamine and have not been able to confirm successful transfection. Does anyone have advice or [ good protocol I could use?

Replies mcallahan
United States

Posts: 3

Send PM
See Mini bio

Status: Frog Egg

Block User
Block IP
Block IP & User

Posted By mcallahan on 12/18/2008 14:27 PM EDIT Reply Delete

Hi Andy,

Have you tried GenePORTER 3000? It's a same-day cell plating/transfection protocol with >90% efficiency. Simply detach healthy log phase cells, count and plate at high density and transfect with GP3K an your plasmid of choice.

Go to: http://genlantis.com/ and click on our banner ad for GP3K. That will take you to the data and manual.

Marie Callahan
Senior Research Scientist
Genlantis, Inc.
A Division of Gene Therapy Systems
(858) 457-1919 Ext. 6130
mcallahan@genlantis.com Jen_Floyd
United States Posts: 34

Send PM
See Mini bio

Status: Moderator

Block User
Block IP
Block IP & User

Posted By Jen_Floyd on 12/18/2008 15:30 PM EDIT Reply Delete

I use lipofectamine 2000. The same-day transfection and plating or reverse transfection will also help boost your percent transfected. Good luck!

Topic Options: [ Lock | Pin | Delete | Move | Edit ]

*FIG. 10*

MINING OF DISTRIBUTED SCIENTIFIC DATA FOR ENRICHED PRODUCT/CONTACT VALUATION

CROSS-REFERENCE TO RELATED APPLICATIONS

This application claims the benefit of U.S. Provisional Patent Application No. 61/179,952, titled "Mining Of Distributed Scientific Data For Enriched Product/Contact Valuation," filed May 20, 2009, the contents of which are hereby incorporated by reference in its entirety.

FIELD

This invention is related to scientific and product information exchange. More particularly, this invention is related to methods and systems for aggregating product information from various science-related forums and providing enhanced relevance/value feedback mechanisms for identified products/contacts.

BACKGROUND

Life researchers and physicians work to discover cures for diseases, develop drugs, and learn about our world. Their job cycle contains the unusual requirement of publishing their discoveries in scientific and medical journals as well as the need to compose grant applications to acquire funds from both public and private sources. Increasingly, life scientists use Internet Web sites ("web") to discover the tools and/or products necessary to complete their research as well as communicate with their peers. The best source of tools and/or product information is within peer-reviewed scientific publications in which the publishing scientist is required to disclose the exact products (name and manufacturer) used to perform a particular scientific application. The tools and/or products are listed in detailed "scientific methods" sections in the publication which allows other scientists to repeat and validate the discovery. This information, however, is embedded in the "Web" and also in private subscription-based forums, making it difficult for any single researcher to find a complete assessment of a sought-after tool or product, or even tools or products that would have a bearing on his project that he may not be aware of.

On the other end of the spectrum, life science product manufacturers are seeking to identify scientists to market their products to. To reach scientists, manufacturers rely on trade shows, product listing sites, advertising in print scientific journals, online advertising, and purchasing lists of validated email lists. Still, it is often difficult or impossible to evaluate the validity of a "sales lead" discovered with these methods. Again the information needed lies hidden in the large unstructured data set of scientific publications, grant applications, and Internet Web sites.

Therefore, there has been a long standing need in the scientific community as well in the scientific vendor community for a mechanism that efficiently provides concise and relevant information on product use, viability, success and so forth. Systems and methods for addressing these and other needs in the communities are elucidated below.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the present disclosure, a method for mining distributed scientific data for enriched product or contact valuation is provided, comprising: obtaining at least one of product data and contact data from a plurality of independently segregated sources using an automatic searching tool; associating the obtained data with keywords relevant to the at least one product and contact data using an automatic association tool; applying a computerized semantic refinement algorithm to the associated data to obtain refined data; and automatically parsing the refined data to an applicable product database and an applicable contact database, wherein the databases contain concise information regarding at least one of a product summary, product review, top citing publications for the product, web mentions, topic summary, related topics, other products in a family, related products, competing products, names of top experts using the product, current market share, market share trends, and Science 2.0 citations, wherein the concise information correlates at least one of product efficacy and product use with the obtained data for efficient valuation thereof.

In another aspect of the present disclosure, a system for mining distributed scientific data for enriched product or contact valuation is provided, comprising: means for obtaining at least one of product data and contact data from a plurality of independently segregated sources using an automatic searching tool; means for associating the obtained data with keywords relevant to the at least one product and contact data using an automatic association tool; means for applying a computerized semantic refinement algorithm to the associated data to obtain refined data; and means for automatically parsing the refined data to an applicable product database and an applicable contact database, wherein the databases contain concise information regarding at least one of a product summary, product review, top citing publications for the product, web mentions, topic summary, related topics, other products in a family, related products, competing products, names of top experts using the product, current market share, market share trends, and Science 2.0 citations, wherein the concise information correlates at least one of product efficacy and product use with the obtained data for efficient valuation thereof.

In yet another aspect of the present disclosure, a system for mining distributed scientific data for enriched product and/or contact valuation is provided, comprising: a communication network; a computerized device connected to the communication network, executing instructions for: obtaining at least one of product data and contact data from a plurality of independently segregated sources on the communication network using an automatic searching tool; associating the obtained data with keywords relevant to the at least one product and contact data using an automatic association tool; applying a computerized semantic refinement algorithm to the associated data to obtain refined data; and automatically parsing the refined data to an applicable product database and an applicable contact database, wherein the databases contain concise information regarding at least one of a product summary, product review, top citing publications for the product, web mentions, topic summary, related topics, other products in a family, related products, competing products, names of top experts using the product, current market share, market share trends, and Science 2.0 citations, wherein the concise information correlates at least one of product efficacy and product use with the obtained data for efficient valuation thereof.

In yet another aspect of the present disclosure, a non-transitory computer-readable medium is provided, comprising: programming code for obtaining at least one of product data and contact data from a plurality of independently segregated sources using an automatic searching tool; programming code for associating the obtained data with keywords relevant to the at least one product and contact data using an automatic association tool; programming code for applying a computerized semantic refinement algorithm to the associated data to obtain refined data; and programming code for automatically parsing the refined data to an applicable product database and an applicable contact database, wherein the databases contain concise information regarding at least one of a product summary, product review, top citing publications for the product, web mentions, topic summary, related topics, other products in a family, related products, competing products, names of top experts using the product, current market share, market share trends, and Science 2.0 citations, wherein the concise information correlates at least one of product efficacy and product use with the obtained data for efficient valuation thereof.

BRIEF DESCRIPTION OF THE DRAWINGS

These and other features and advantages of the invention will now be described with reference to the drawings of certain preferred embodiments, which are intended to illustrate and not to limit the invention.

FIGS. 8A-B are exemplary screen shots of a representative refined data set for an example product (Lipofectamine 2000) for semantic enrichment using processes.

FIG. 9 is a screen display illustrating an HTML page displaying relevant product data for the example product (MiniOpticon).

FIG. 10 is an exemplary screen display illustrating an HTML page within a blog environment.

DETAILED DESCRIPTION

Figure 1:
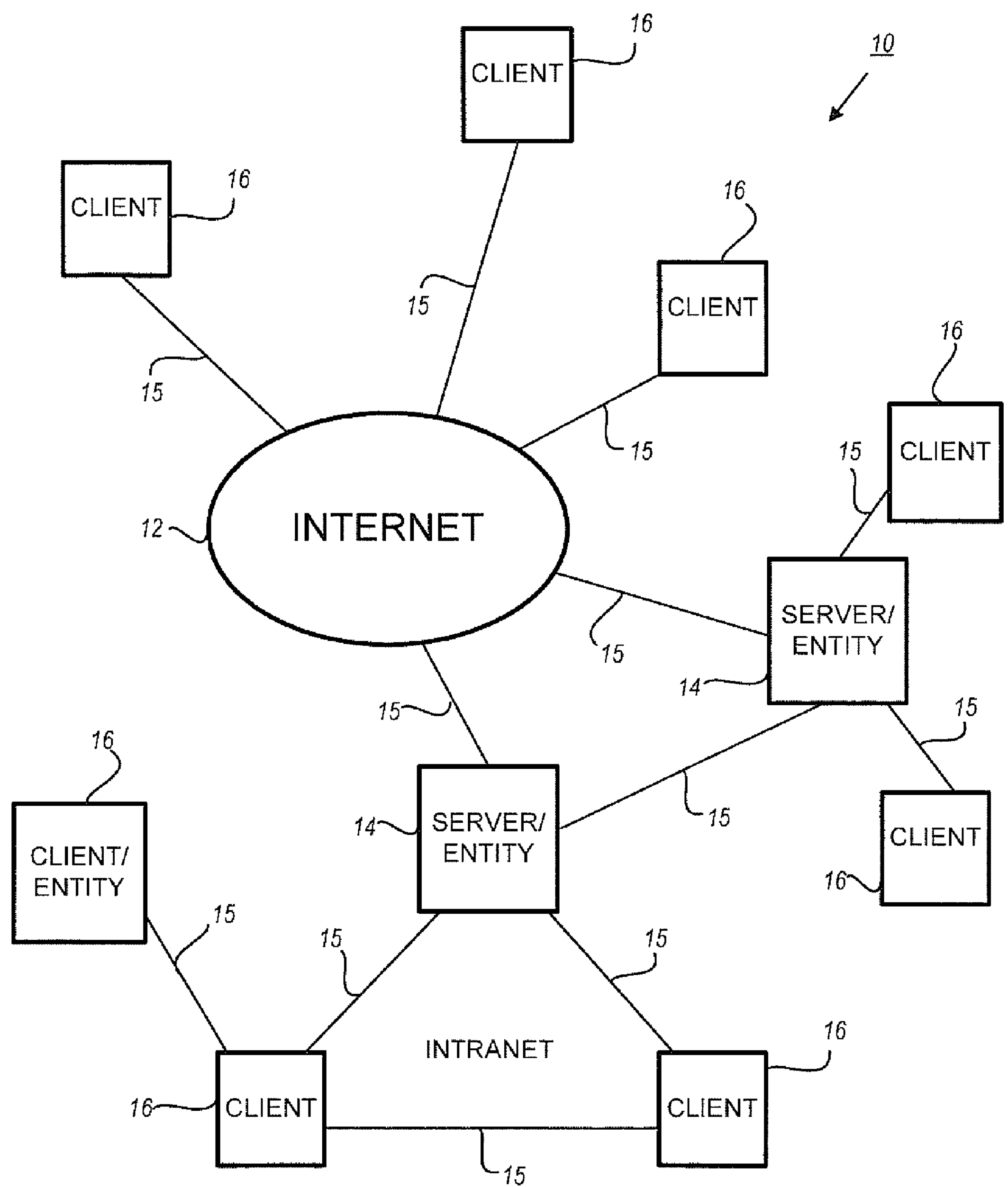
FIG. 1 is a high-level client-server-Internet diagram.

In various embodiments described below, methods and systems are provided for aggregating/mining/distilling product-based information to facilitate informed and rapid purchases of products. This information can be facilitated by a primary entity, such as in an exemplary website that provides information hosting capabilities. Via this website, scientists can also communicate, find jobs and scientific conferences, research and discover products, and ultimately purchase products to aid their experimentation.

While the below descriptions are cast in the context of life sciences, physicians, and researchers, it is explicitly understood that the various embodiments and disclosures herein may be utilized in other disciplines, as found applicable. Therefore, the exemplary discussions provided below can be modified to be applicable to other disciplines and categories of professions, without departing from the spirit and scope of this disclosure.

Introduction

As alluded to above, information containing the use and/or success of various products presented in scientific publications and in various scientific forums is usually dispersed in seemingly unrelated or only tenuously related articles. Therefore, this presents a major bottleneck for scientists determining the "correct" products to utilize in a specific scientific application, as well as the fact that science deals in exacting minutia (e.g., a product that works correctly for analyzing one virus may not work for another). To find products, scientists must conduct extensive research such as utilizing peer-to-peer contacts, trade shows, trade magazines, company websites, product listing websites, and online professional networks. However, it is apparent to the inventors that the source of product information lies within the bevy of peer-reviewed scientific publications—in which the publishing scientist is required to disclose the exact products (name and manufacturer) used to perform a particular scientific application. The products are listed in detailed "scientific methods" sections that are essential to allow other scientists to repeat and validate the discovery.

Additionally, the majority of published research articles are proprietary and accessible by subscription-only, making them inaccessible to modern computerized search tools. Furthermore, these articles represent a large, unstructured data set even if they are freely accessible on the Internet (open access). Thus, scientists spend countless hours reading Experimental Methods sections of publications in order to find products used successfully by their peers, if the information is freely available. For subscription or fee-based information, researchers at small Biotech companies and at less fortunate research institutes are usually unable to obtain the publications due to the high subscription/fee costs involved.

Conversely on the commercial side, product manufacturers are seeking to identify scientists to market their products to. Their approach is typically to rely on trade shows, product listing sites, advertising in print scientific journals, online advertising, and purchasing lists of validated emails lists. Another problem commonly faced by life science product manufacturers is an inability to efficiently attract potential scientific consumers to their Web sites.

Description

The present disclosure describes the implementation and use of rapid validation of scientific products and scientist consumer information derived from peer-reviewed scientific publications and online resources (e.g., blogs, discussion boards, university websites, patents, etc), for example, as well as any other available tasked forum or venue. A hub for implementation of the various embodiments described herein can be resourced from an exemplary primary entity or Web site, such as one sponsored by SCIENTISTSOLUTIONS.COM. The obtained refined and extrapolated data set will facilitate unique opportunities via an accessible website/forum and trade shows, etc., such as presented by the exemplary website, for example. Concomitantly, the garnered information and data points can provide previously unknowable "sales leads," market intelligence, and targeted advertising opportunities for life science product manufacturers through the same outlets. The systems and methods can be implemented in part by semantic software tools that refine product data or a scientist's information to discover and derive connections from scientific publications and online resources and other searchable venues.

In one embodiment, another available feature is the refinement of scientific product information to facilitate product sales starting with only a product name and SKU number, as one example. Life science product names can be easily identified by mention in online discussions, such as on the exemplary SCIENTISTSOLUTIONS.COM's scientific community Web site, infonnation requests on the SCIENTISTSOLUTIONS.COM's e-commerce Web site, or by direct submission of product lists from life science product manufacturers, and so forth. The product names can then be categorized and tagged with a proprietary list of keywords associated with similar scientific products. These keywords permit the semantic enrichment of product information beyond a simple description provided by the manufacturer. To accomplish this, each product can be designated with a unique identifier code. In some instances, it may be submitted to a semantic enriching source such as provided by Parity Computing Inc., for example. The semantic enriching can be accomplished by mining relationships to the product name by linking data from scientific publications and the Internet, as several possible resource examples. The resulting mined information can formulate relationships between products and between users/experiments, and enable higher degrees of correlation and information transparency. As one example, from this large unstructured data set, a product profile can be derived including experimental application details, the number and relevancy of publications mentioning the product, identification of competing products, market share for the product, as well as identification of scientists using the products by name and scientific field (e.g., cancer, diabetes, neurosurgery), and so forth. The refined product information can be ultimately stored in a database server (may be secure) that can be recalled using each product's unique identifier code, if so designed.

In another embodiment, another aspect is that the refined product information can be displayed via code, referred to generally as a "web services call," into widgets that can be coded to appear on any Web site. This will allow the primary entity or owner of the information to utilize discreet blocks of product information to generate revenue, according to various methods described below.

In another embodiment, software running on an e-commerce site (for example, on SCIENTISTSOLUTIONS.COM) can display a portion of the derived product information to supply scientists with the appropriate data to make an informed purchase decision. That is, based on the quality and value of information provided to a recipient, the recipient can be ushered into a purchase option. For example, it is understood by the inventors that the publication in an Experimental Methods section of a peer-reviewed scientific publication represents the ultimate verification of a given product's usefulness to a scientist since, by necessity, the product must have functioned properly for other scientists. Furthermore, the total number of scientists publishing manuscripts citing a given product provides a useful measure to compare competitive products. Thus, a list of publications citing a particular product(s) would appear along with the product information on an exemplary Web page, referred to here as a "product page." A scientist, viewing this comprehensive "history" of the product(s), can then rapidly discover the correct product to perform a given experiment and is more likely to make a purchase via a "Buy Now" link or equivalent from the product information page.

The tabulation of Experimental Methods or an equivalent could be searched based on a scientist's request, to enable the scientist to quickly and easily view all or a limited set of products that were used with a selected search constraint. That is, a scientist could search for all products that were in Experimental Methods related to a particular form of treatment, for example. And based on that result the scientist will be provided information as to which product was more popular, used with higher success rates, etc.

Consequently, the above collation of information, having metrics assessed thereto, about a given product(s) married with an option to immediately purchase the product(s), provides a degree of information-to-purchase transference not available in the current state of art regarding products found in the scientific community and other communities.

In another embodiment, an option may be provided to enable the scientist to seek more detailed information via a "click through" or "referral link" from the product page to a manufacturer's or product reseller's Web site. Scientists may also use the same publication information to match products to highly specific experimental applications. For example, a scientist could discover whether a particular product was preferred by others working on a specific cell type, disease state, or within their own institution. That is, as one example, if the scientist is aware of another scientist's work in a particular area, he can see if that particular product was used by the other scientist. This information would provide both validation of product acceptance/success, or in the converse, if the other scientist's results were less than favorable, an opportunity to see if that product could have contributed to the less than favorable result, either by cross-referencing other users of that product and/or other scientists using a dissimilar product.

In one embodiment, the web services data recall may be configured to also allow a portion of the data to be ported to business partners of the primary entity/SSI. For example, product manufacturers could display a product widget that enables scientists to make better-informed decisions about a product directly on a "product page" hosted on their Web site. Further, scientific Web sites, blogs, news sites, scientific journals, etc. can become affiliate partners of the primary entity to market and sell products mentioned in their content with a similar widget. The affiliate partners can in turn be paid a commission based on the referral links back to the primary entity, directly to the product manufacturer's Web site, or based on the actual purchase of a specific product.

As another embodiment, synergies obtained by collating the mined information can be extrapolated into or from a scientific online community. For example, it is known that within the community discussion boards experiments are discussed in detail including the use of specific products. This represents a novel opportunity to promote products to aid scientists directly tied to key concepts and product names within their posts using a data widget. Thus, these products and/or information regarding these products can be presented for reading to a particular scientific discussion by utilizing the refined data and non-obvious connections created by a semantic enrichment process. As a commercial embodiment, the primary entity featuring the discussion board(s) can directly embed a "referral link" or "Buy Now" button within a discussion. The same type of targeting can be utilized by affiliate websites of the primary entity to promote products as mentioned herein. These features and others are detailed below in the following Figures.

FIG. 1 is a high-level client-server-Internet diagram 10. Internet cloud 12 is connected to various servers 14 and clients 16 either directly or indirectly via connections 15. The connections 15 may be hard line or wireless or any combination thereof. The servers 14 can host individually or in a distributed format, the primary entity's software and mechanisms for providing the features of the various embodiments discussed above. In some instances, the primary entity's software and mechanisms may be hosted on a client machine 16, depending on design and machine capabilities. The various servers 14 and clients 16 will be computing stations with appropriate support hardware, such as disk drives, processors, and so forth. It is understood that FIG. 1 is a general description of a client-server Internet diagram and therefore does not describe all the possible connections, hardware and arrangements for communication/processing hardware that may be utilized. Therefore, modifications may be made to the features of FIG. 1 with the understanding that they are within the scope and purview of the various exemplary embodiments described herein. The overall layout shown in FIG. 1 provides a hardware, aka—machine basis for deploying the various systems and methods described herein.

Figure 2:
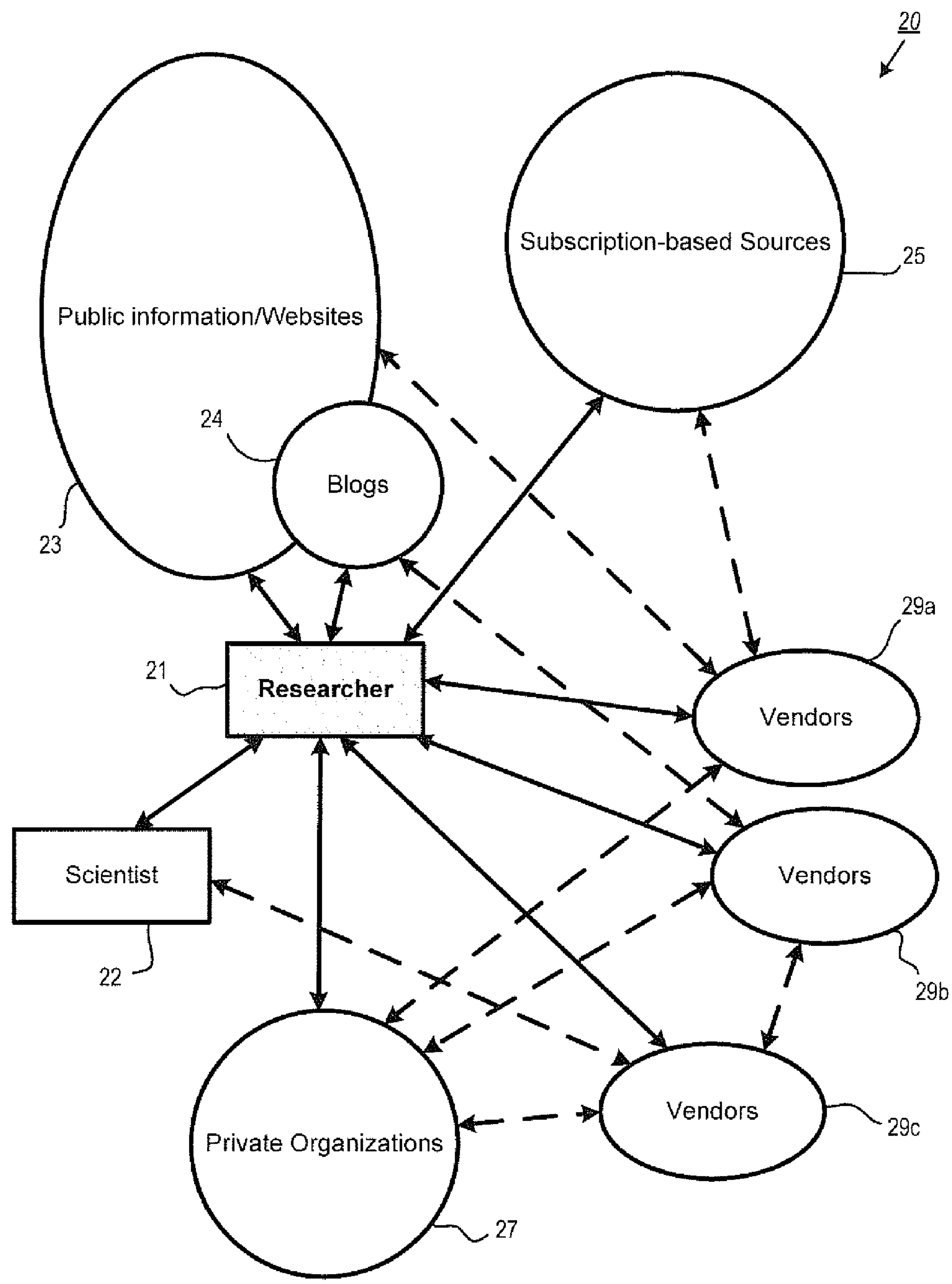
FIG. 2 is a simple diagram 20 illustrating the compartmentalization of current product information among different forums.

FIG. 2 is a simple diagram 20 illustrating the compartmentalization of current product information among different forums. In particular, researcher 21, in seeking information on a particular product for his experiment may consult a fellow scientist 22 for recommendations. However, because of conditions that may be different from the fellow scientist's 22, or the need for more sample data, etc., the researcher 21 may need more information or seek other types of products, and so forth. Thus, the researcher 21 will typically expend many valuable hours or weeks (and money) researching through public information repositories or websites 23, blogs 24, subscription-based services 25, private organizations 27, vendors 29*a-c*, and so forth.

As apparent from the solid arrows in FIG. 2, there are many sources of information (mostly conveyed through hardware channels—Internet, computers, etc.) that the researcher 21 must wade through to make a proper assessment of a product's relevance and use to his experiment. Similarly, vendors 29*a-c* or manufacturers of the products must expend an enormous amount of energy and resources informing and advertising to the various forums 22-27. While FIG. 2 is a rudimentary overview of a typical researcher's approach to finding product information, and does not describe all the possible avenues that a researcher may exploit, it is instructive in that it shows the breadth of difficulty a researcher is faced with when attempting to investigate a suitable product for his experiment.

Figure 3:
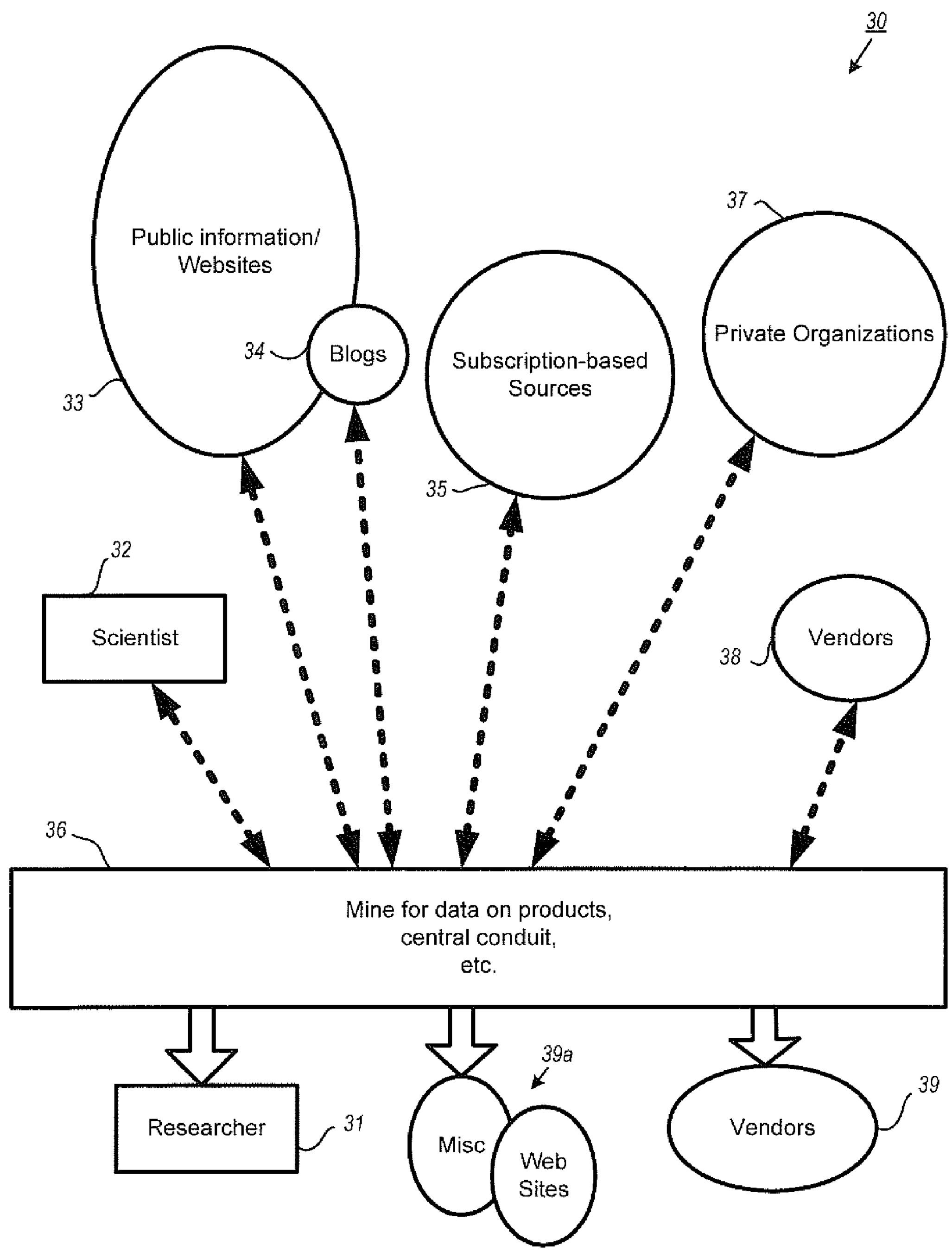
FIG. 3 is a high level block diagram illustrating an exemplary system and approach to addressing the deficiencies described in FIG. 2.

FIG. 3 is a high level block diagram illustrating an exemplary system and approach to addressing the deficiencies described in FIG. 2. In accordance with the various embodiments described herein, a centralized or focal point of information 36 collation and retrieval can be generated by mining the various resources 32-36 that the researcher 31 would otherwise perform through a manual procedure. Specifically, an automatic mining of data/product information can be facilitated, using the various mechanisms, hardware, software and coordination described herein to efficiently identify, semantically tag, transform the sought after information to a format that is easily available to the researcher 31. Of note here is the scenario where the same or some variant of that product information is provided to the vendor 39, to enhance their information/sales database, and/or to miscellaneous consumers (as one possible example, web sites serving that community) 39*a* of that information The information and/or data obtained is facilitated in many respects by the use of computer hardware to automate the mining/retrieval/transformation of the embedded information by using various elements of the layout shown in FIG. 1. Mining algorithms are used to sort through the enormous volumes of information that is available, with some algorithms being proprietary or publically known. In an exemplary embodiment, a searching and mining algorithm devised by Parity Computing, Inc. has been used to demonstrate feasibility. Other mining techniques and procedures that are known in the public or proprietary may be used according to design implementation.

Figure 4:
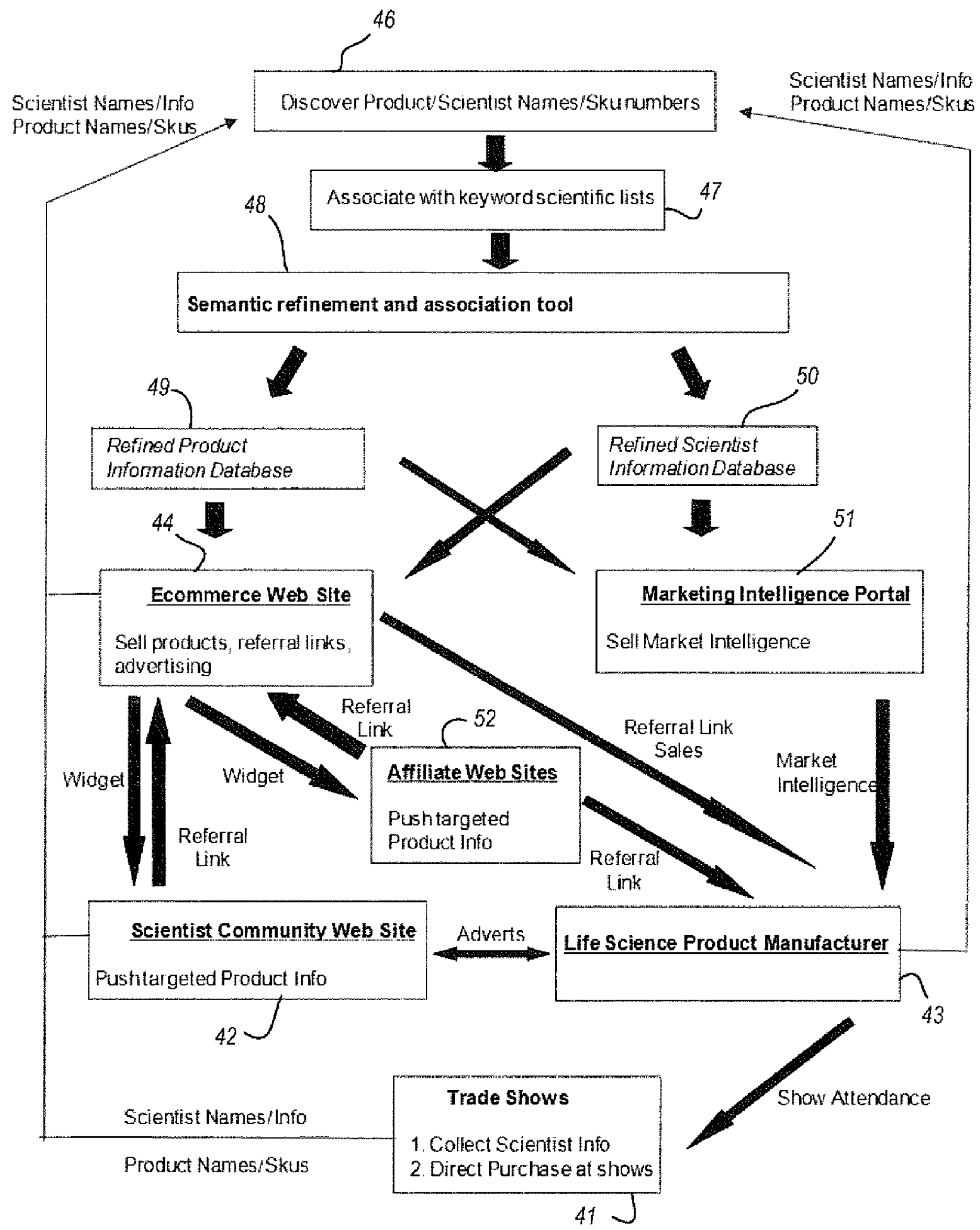
FIG. 4 is a high-level architectural drawing illustrating various flows of extracted/transformed information and their control as well as options for commercial exploitation of that information.

FIG. 4 is a high-level architectural drawing 40 illustrating various flows of extracted/transformed information as well as their control as well as options for commercial exploitation of that information. In this diagram, source of product information is shown as originating from Trade Shows 41 (such as provided by Scientist Solutions, Inc.—SSI). However, it is understood that other sources of information may be utilized, such as by a Community Web Site 42 (such as provided by Scientist Solutions, Inc.—SSI), Product Manufacturers 43, E-commerce site 44, and so forth. Therefore, while FIG. 4 describes one possible set of originating data, other sets of originating data may be devised without departing from the spirit and scope of this disclosure.

Returning to the process flow, from these sources 41-44, scientists' names/info can be obtained and product info/SKUs, for example. A database 44 is populated with this information and organized to discover the product and obtain additional levels of organization/information, as according to design preference. Next, association methodologies 47 can be applied to the database information to associate the various product information with scientific keywords or to determine a relatedness or ranking of the products and so forth. A semantic refinement tool 48 is applied to further mine and extract/correlate the product information with other factors or information or descriptors that would have a bearing on a product (and scientist, if so desired). The results are apportioned into a refined product information database 49 and a refined scientist information database 50. The process flow takes the refined product information and feeds it to the E-commerce site 44 to assist in selling products, presenting referral links, advertising, and also to the Marketing Intelligence Portal 51. As can be evident, a feedback between the information originally provided by the E-commerce site 44 and other gathered information can be utilized to enhance or update the information presented on the E-commerce site 44. This feedback would be automatically generated by a computer or other automated apparatus.

Similarly, the refined scientist information would be forwarded to the Marketing Intelligence Portal 51, that would cull the information and, based on certain decision parameters, forward the culled information (or raw) to the Product Manufacturer 43. With this process flow of information, the Product Manufacturer 43 can obtain higher "quality" of scientists' use information as well as any other information that is garnered from the exemplary processes. From the E-commerce site 44, information that is generated, etc. can be forwarded to various other forums such as Affiliate Web Sites 52, Community Web Site 42 and the Product Manufacturers 43, for referrals, for example. In turn, the Product Manufacturers 43 can forward their renewed intelligence to the Trade Shows 41, for higher selling potential/advertising. With the new intelligence, the Product Manufacturers 43 can be better positioned for advertising on the Community Web Site 42.

With this so-called cross pollination of information that is generated by the exemplary processes and mining of product/ scientist information, the difficulties demonstrated in FIG. 2 can be minimized and intelligence that hereto was not available for the different consumers (e.g., scientists, manufacturers, web sites, communities, etc.) can be made available with a higher degree of accuracy and relevance. Additionally, for the manufacturers of various products, with this intelligence, they can become more focused with their advertising and save advertising costs. All of these features are implemented in various degrees using an automated process through the use of computers and software running on the computer(s), performing the assorted levels of information extraction, correlation, transformation, tagging, semantic analysis, and so forth. As a point of emphasis, these various processes require computers to process the enormous amounts of information and therefore, cannot be implemented by an individual.

Figure 5:
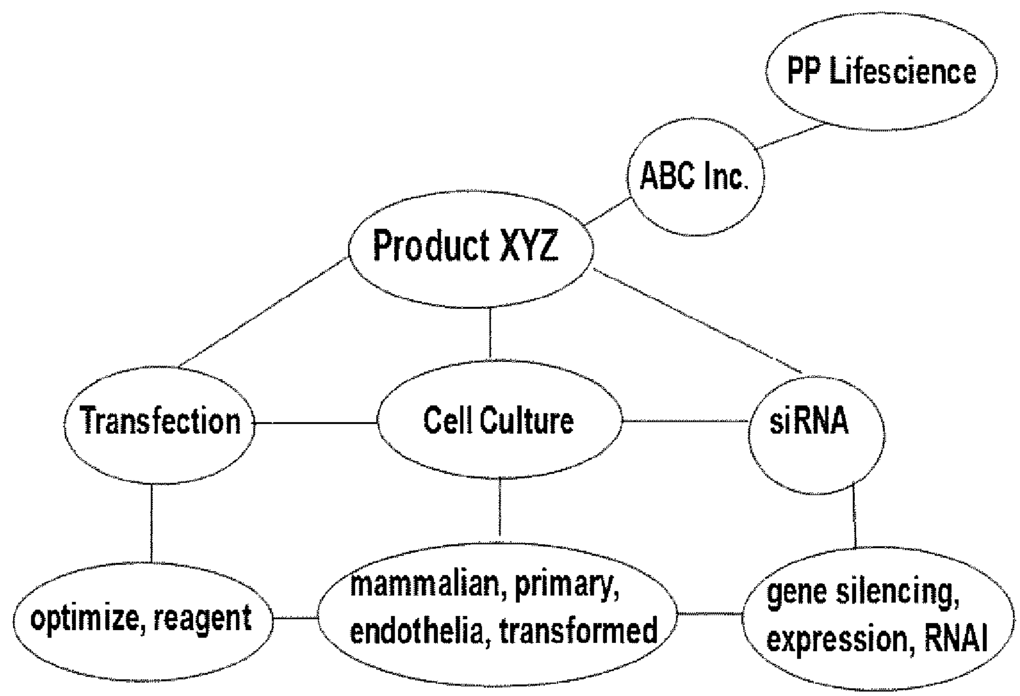
FIG. 5 is a diagram showing an example of exemplary keyword associations that facilitate an exemplary semantic enrichment process.

FIG. 5 is diagram showing an example of exemplary keyword associations that facilitate the semantic enrichment process. This diagram is instructive in showing how various levels of information can be extracted/mined from the initial set of data provided by the product name: XYZ. Many of the correlations that are made will be based on databases formulated to provide intelligence pairing of keywords with a product. That is, for a known product XYZ, the association of Transfection, Cell Culture, siRNA, etc., may be automatically performed, while additional associations may occur as more knowledge of a product is obtained. It is noteworthy to recognize that the associations for the product XYZ can be mapped with a topology for efficient tagging, etc.

Figure 6:
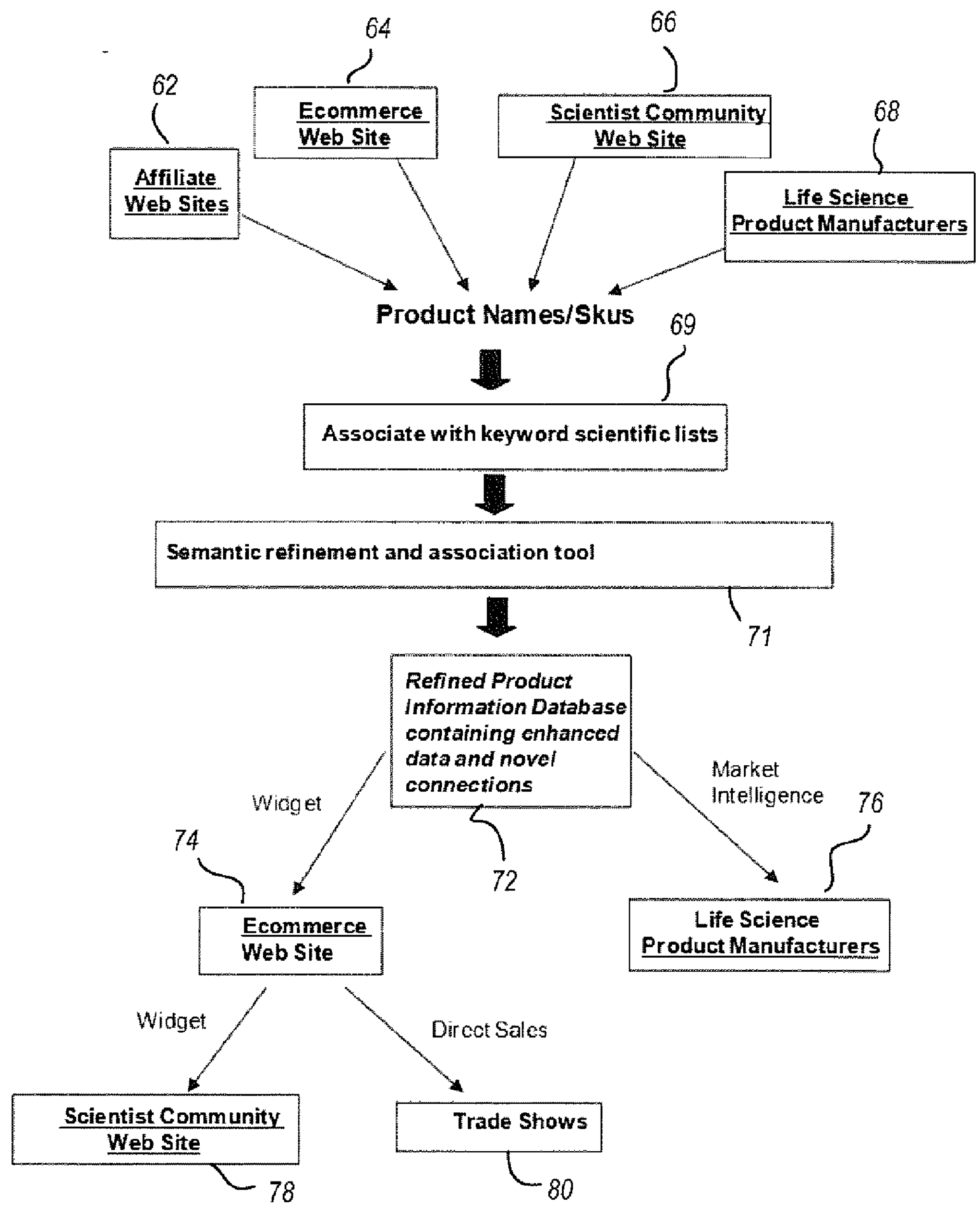
FIG. 6 is a detailed flow diagram illustrating the exemplary entry, semantic enrichment, and data display of a life science product.

FIG. 6 is a detailed flow diagram illustrating the exemplary entry, semantic enrichment, and data display of a life science product. This diagram is another variation of the process flow and mechanisms described in FIG. 4 and is instructive in showing how different arrangements of input and output can be generated for maximizing the obtained information's value. In this example, the primary information is the product names/SKUs, which can be sourced from Affiliate Web Sites 62, E-commerce Site(s) 64, Community Site(s) 66, and Product Manufacturers 68. The obtained product names/SKUs can then be associated with keyword scientific lists 69 and a semantic refinement/association can be performed 71. The resulting information is stored in a database(s) 72 and distributed to the same or another E-commerce site 74 or Product Manufacturer(s) 76. The E-commerce site can further provide the mined and transformed information to Community Site(s) 78 and/or Trade Show(s) 80.

Figure 7:
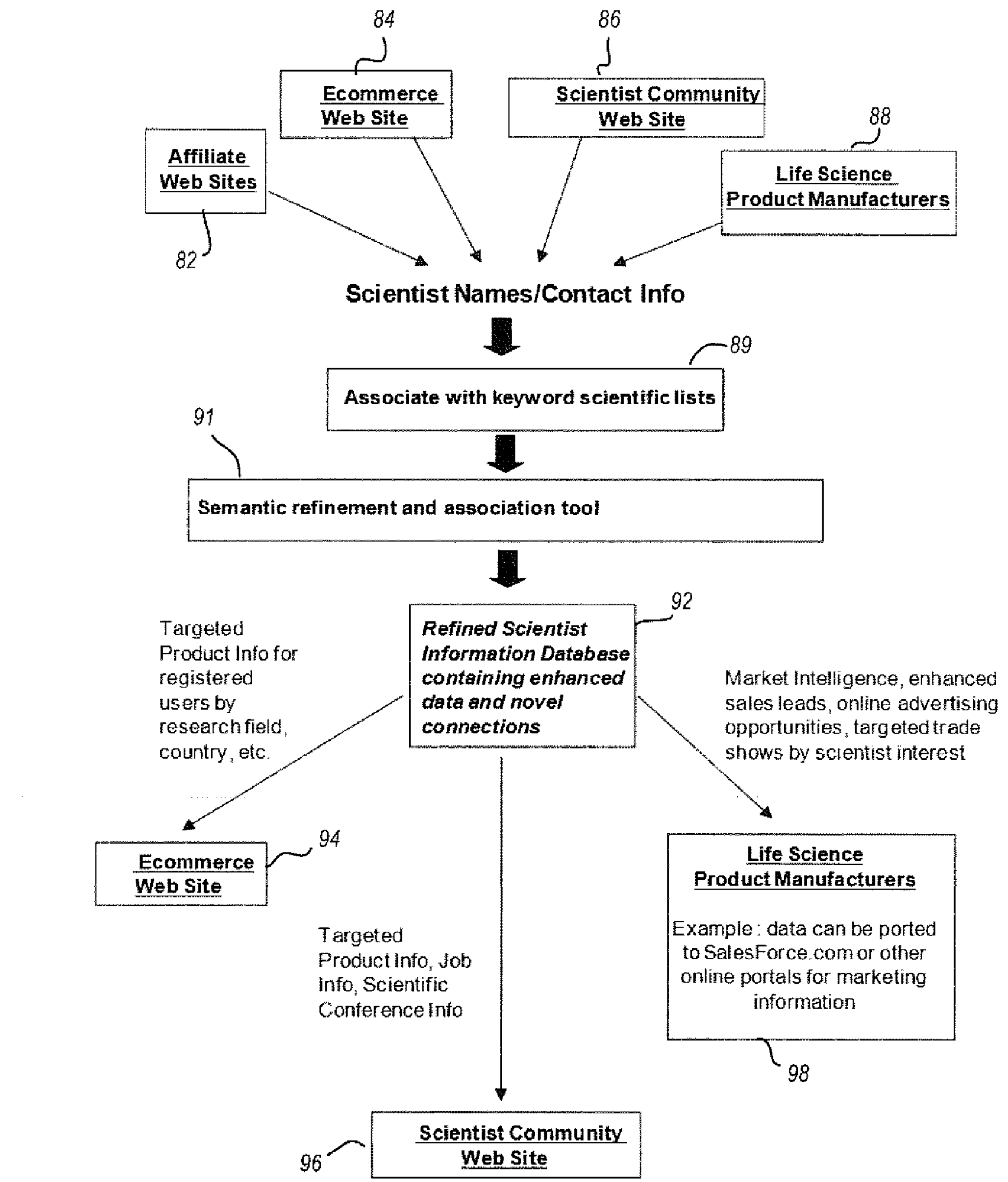
FIG. 7 is a flow diagram illustrating the entry, semantic enrichment, and data display of life scientist consumer data.

FIG. 7 is a flow diagram illustrating the entry, semantic enrichment, and data display of life scientist consumer data. Scientists' names and contact information can be automatically obtained via Affiliate Web Sites 82, E-commerce Sites 84, Community Sites 86, and Product Manufacturers 88, using software or other automated procedures. Thereafter, the obtained information can be associated with keyword scientific lists 89 and then operated upon using semantic refinement and association tools, such as provided by Parity Computing, Inc. Next, the manipulated information can be stored in a refined database 92 and distributed to the various clients 94, 96 and 98, as similarly described above.

FIGS. 8A-B are screen shots of a representative refined data set for an example product (Lipofectamine 2000) for semantic enrichment using processes for information extraction/semantic analysis, etc. Evident are the different levels of information/metrics that are obtained, such as reviews, top citing publications, web mentions, topic summary, related topics, other products, related products, competing products, top experts, market share, trends, Science 2.0 citations, and so forth. This example provides a good illustration of the breadth of information that is automatically afforded the user that prior to this invention would not have been available. Also, because of the organization shown, the user can more readily make an informed decision for a given product, as well as a scientist's use of that product.

FIG. 9 is a screen display illustrating an HTML displaying relevant product data for the example product MiniOpticon Real-Time PCR Detection System in a community or affiliate web site. Based on the arrangement between the sourcing agency (SSI) and the affiliate web site, different levels of information may be showcased on the community/affiliate web site. For example, in FIG. 9, product summary, top citations, reviews, related products, and experimental work flow is exhibited to the user. With a "Buy Now" feature embedded within this web view (for example, in the Embed Widget window), the user can now purchase the product armed with more knowledge than what would be ordinarily available. Thus, manufacturers of this product would benefit from the increased awareness and statistical knowledge that is collected and distributed.

FIG. 10 is a screen display illustrating an HTML page displaying data derived from non-obvious connections to promote products within a blog environment, and shows another forum that would benefit from the exemplar systems and methods described herein. For example, some of the areas available in the blog environment may be configured for promoting the exemplary processes/SSI garnered information. One such method may be similar to Google's™ approach to advertising information/links related to the blogger's information, wherein the products could be hyperlinked in these areas.

In view of the above examples, subscription-based revenue could be generated or other forms of revenue (Ad-based, click-based, etc.) for the sourcing entity (e.g., SSI). Thus, by aggregating information and extracting statistics and information through mining and semantic associations, that would not be otherwise practically available, increased sales can be obtained as well as streamlining the product review and research cycle that scientists must perform.

It should be understood that the steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A computerized method for mining distributed scientific data for enriched product or contact valuation, comprising:

obtaining distributed scientific product data related to life science products, presented in scientific publications, in scientific forums, peer-reviewed scientific publications and online resources and contact data from a plurality of independently segregated sources using an automatic searching tool, said distributed scientific product data comprising data from subscription based resources and data from non-subscription based resources;

using a computer to associate the obtained data with keywords relevant to the product and contact data using an automatic association tool;

applying a computerized semantic refinement algorithm to the associated data to obtain refined data, the applying of the computerized semantic refinement algorithm including mining relationships to search objects by linking data from scientific publications and other distributed scientific product data from the subscription based resources and the non-subscription based formulate relationships between the search objects and the linked data, thereby enhancing correlation and information transparency; and using the computer to parse the refined data to an applicable life science product database and an applicable contact database and outputting information from the computer, wherein the databases contain concise information regarding at least one of a product summary, product review, top citing publications for the product, web mentions, topic summary, related topics, other products in a family, related products, competing products, names of top experts using the product, current market share, market share trends, and Science 2.0 citations, wherein the concise information correlates at least one of product efficacy and product use with the obtained data for efficient valuation thereof.

2. The method of claim 1, wherein one of the individually segregated sources is at least one of a subscription based source, product manufacturer, and web-based source.

3. The method of claim 1, further comprising providing concise information feedback to at least one of a product manufacturer, public website, e-commerce site, community website, and trade show.

4. The method of claim 1, wherein the individually segregated sources includes reviews by product manufacturers and scientists.

5. The method of claim 1, further comprising developing marketing intelligence based on the concise information.

6. The method of claim 1, further comprising displaying the concise information in a format having at least one of a product summary, product review, top citing publications for the product, web mentions, topic summary, related topics, other products in a family, related products, competing products, names of top experts using the product, current market share, market share trends, and Science 2.0 citations.

7. The method of claim 6, wherein the displaying includes displaying a web-based link to a manufacturer of a displayed product.

8. The method of claim 6, wherein the displaying includes displaying a list of scientific validations of a product.

9. A system for mining distributed scientific data for enriched product or contact valuation, comprising:

computer hardware means for obtaining distributed scientific product data related to life science products, presented in scientific publications, in scientific forums, peer-reviewed scientific publications and online resources and contact data from a plurality of independently segregated sources from scientific publications and the Internet using an automatic searching tool, said distributed scientific product data comprising data from subscription based resources and data from non-subscription based resources;

computer hardware means for associating the obtained data with keywords relevant to the product and contact data using an automatic association tool;

means for applying a computerized semantic refinement algorithm to the associated data to obtain refined data, the applying of the computerized semantic refinement algorithm including mining relationships to search objects by linking data from scientific publications and other distributed scientific product data from the subscription based resources and the non-subscription based resources as several possible resource examples, and using the resulting mined information to formulate relationships between the search objects and the linked data, thereby enhancing correlation and information transparency; and computer hardware means for automatically parsing the refined data to an applicable life science product database and an applicable contact database, wherein the databases contain concise information regarding at least one of a product summary, product review, top citing publications for the product, web mentions, topic summary, related topics, other products in a family, related products, competing products, names of top experts using the product, current market share, market share trends, and Science 2.0 citations, wherein the concise information correlates at least one of product efficacy and product use with the obtained data for efficient valuation thereof.

10. The system of claim 9, further comprising means for providing concise information feedback to at least one of a product manufacturer, public website, e-commerce site, community website, and trade show.

11. The system of claim 9, further comprising means for developing marketing intelligence based on the concise information.

12. The system of claim 9, further comprising means for displaying the concise information in a format having at least one of a product summary, product review, top citing publications for the product, web mentions, topic summary, related topics, other products in a family, related products, competing products, names of top experts using the product, current market share, market share trends, and Science 2.0 citations.

13. A system for mining distributed scientific data for enriched product and/or contact valuation, comprising:

a communication network;

a computerized device connected to the communication network, executing instructions for:

obtaining distributed scientific product data related to life science products, presented in scientific publications, in scientific forums, peer-reviewed scientific publications and online resources and contact data from a plurality of independently segregated sources on the communication network using an automatic searching tool, said distributed scientific product data comprising data from subscription based resources and data from non-subscription based resources;

associating the obtained data with keywords relevant to the product and contact data using an automatic association tool;

applying a computerized semantic refinement algorithm to the associated data to obtain refined data, the applying of the computerized semantic refinement algorithm including mining relationships to search objects by linking data from scientific publications and other distributed scientific product data from the subscription based resources and the non-subscription based resources as several possible resource examples, and using the resulting mined information to formulate relationships between the search objects and the linked data, thereby enhancing correlation and information transparency; and automatically parsing the refined data to an applicable life science product database and an applicable contact database, wherein the databases contain concise information regarding at least one of a product summary, product review, top citing publications for the product, web mentions, topic summary, related topics, other products in a family, related products, competing products, names of top experts using the product, current market share, market share trends, and Science 2.0 citations, wherein the concise information correlates at least one of product efficacy and product use with the obtained data for efficient valuation thereof.

14. The system of claim 13, wherein one of the individually segregated sources is at least one of a subscription based source, product manufacturer, and web-based source.

15. The system of claim 13, wherein the computerized device further executes instructions for providing concise information feedback to at least one of a product manufacturer, public website, e-commerce site, community website, and trade show.

16. The system of claim 13, wherein the individually segregated sources includes reviews by product manufacturers and scientists.

17. The system of claim 13, wherein the computerized device further executes instructions for developing marketing intelligence based on the concise information.

18. The system of claim 13, further comprising a display, wherein the computerized device executes instructions for displaying the concise information on the display in a format having at least one of a product summary, product review, top citing publications for the product, web mentions, topic summary, related topics, other products in a family, related products, competing products, names of top experts using the product, current market share, market share trends, and Science 2.0 citations.

19. The system of claim 18, wherein the computerized device executes instructions for displaying at least a web-based link to a manufacturer of a displayed product and a list of scientific validations of a product.

20. A non-transitory computer-readable medium comprising:

programming code for obtaining distributed scientific product data related to life science products, presented in scientific publications, in scientific forums, peer-reviewed scientific publications and online resources and contact data from a plurality of independently segregated sources using an automatic searching tool, said distributed scientific product data comprising data from subscription based resources and data from non-subscription based resources;

programming code for associating the obtained data with keywords relevant to the product and contact data using an automatic association tool;

programming code for applying a computerized semantic refinement algorithm to the associated data to obtain refined data, the applying of the computerized semantic refinement algorithm including mining relationships to search objects by linking data from scientific publications and other distributed scientific product data from the subscription based resources and the non-subscription based resources as several possible resource examples, and using the resulting mined information to formulate relationships between the search objects and the linked data, thereby enhancing correlation and information transparency; and programming code for automatically parsing the refined data to an applicable life science product database and an applicable contact database, wherein the databases contain concise information regarding at least one of a product summary, product review, top citing publications for the product, web mentions, topic summary, related topics, other products in a family, related products, competing products, names of top experts using the product, current market share, market share trends, and Science 2.0 citations, wherein the concise information correlates at least one of product efficacy and product use with the obtained data for efficient valuation thereof.

* * * * *